US010496960B2

(12) United States Patent
Jackson et al.

(10) Patent No.: US 10,496,960 B2
(45) Date of Patent: Dec. 3, 2019

(54) SYSTEM FOR MANAGING SCHEDULING CONFLICTS (71) Applicant: AT&T INTELLECTUAL PROPERTY I, L.P., Atlanta, GA (US)

(72) Inventors: James Jackson, Austin, TX (US); Mehrad Yasrebi, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/488,823

(22) Filed: Apr. 17, 2017

(65) Prior Publication Data

US 2017/0221014 A1  Aug. 3, 2017

Related U.S. Application Data

(63) Continuation of application No. 14/516,738, filed on Oct. 17, 2014, now Pat. No. 9,659,281, which is a continuation of application No. 14/274,034, filed on May 9, 2014, now Pat. No. 8,891,752, which is a continuation of application No. 13/951,660, filed on Jul. 26, 2013, now Pat. No. 8,761,368, which is a continuation of application No. 13/759,144, filed on Feb. 5, 2013, now Pat. No. 8,520,824, which is a
(Continued)

(51) Int. Cl.
| | |
|---|---|
| *G06Q 10/10* | (2012.01) |
| *H04M 3/42* | (2006.01) |
| *H04M 3/54* | (2006.01) |
| *H04L 29/06* | (2006.01) |
| *H04L 29/08* | (2006.01) |
| *H04M 3/48* | (2006.01) |
| *H04M 3/533* | (2006.01) |

(52) U.S. Cl.
CPC ....... *G06Q 10/1095* (2013.01); *G06Q 10/109* (2013.01); *H04L 65/1016* (2013.01); *H04L 65/1069* (2013.01); *H04L 65/40* (2013.01); *H04L 67/24* (2013.01); *H04M 3/42* (2013.01); *H04M 3/42059* (2013.01); *H04M 3/42365* (2013.01); *H04M 3/48* (2013.01); *H04M 3/53308* (2013.01); *H04M 3/54* (2013.01); *G06Q 10/10* (2013.01); *G06Q 10/1093* (2013.01); *H04M 2203/2072* (2013.01)

(58) Field of Classification Search
None
See application file for complete search history.

(56) References Cited

U.S. PATENT DOCUMENTS 5,872,841 A * 2/1999 King ............... H04M 3/432
379/205.01
6,160,883 A * 12/2000 Jackson ........... H04M 3/4217
379/221.01
(Continued)

FOREIGN PATENT DOCUMENTS

WO 2006/036356 6/2006

*Primary Examiner* — Hicham B Foud
(74) *Attorney, Agent, or Firm* — Guntin & Gust, PLC; Mark Wilinski (57) ABSTRACT

A system that incorporates teachings of the present disclosure may include, for example, a proactive scheduler having a controller element to determine a scheduling conflict between a called party and a calling party according to calendar information of the called party and presence information of the called party. Additional embodiments are disclosed.

20 Claims, 3 Drawing Sheets

Related U.S. Application Data continuation of application No. 11/780,696, filed on Jul. 20, 2007, now Pat. No. 8,391,459.

(56) References Cited

U.S. PATENT DOCUMENTS

| | | | | |
|---|---|---|---|---|
| 6,889,321 | B1* | 5/2005 | Kung | H04L 29/06027 348/E7.056 |
| 7,356,307 | B1* | 4/2008 | Parker | H04M 3/42263 370/352 |
| 7,715,373 | B1* | 5/2010 | Parker | H04M 3/42263 370/352 |
| 2002/0016729 | A1 | 2/2002 | Breitenbach et al. | |
| 2002/0154752 | A1 | 10/2002 | Carpenter | |
| 2003/0104819 | A1* | 6/2003 | Knauerhase | H04W 4/02 455/456.1 |
| 2004/0037406 | A1* | 2/2004 | Gourraud | H04L 12/1822 379/202.01 |
| 2004/0054726 | A1* | 3/2004 | Doss | G06Q 10/109 709/205 |
| 2004/0064567 | A1* | 4/2004 | Doss | G06Q 10/063114 709/228 |
| 2004/0218734 | A1 | 11/2004 | Gilbert et al. | |
| 2005/0216842 | A1* | 9/2005 | Keohane | G06Q 10/109 715/733 |
| 2006/0047557 | A1 | 3/2006 | Bieselin et al. | |
| 2006/0075038 | A1 | 4/2006 | Mason et al. | |
| 2006/0101143 | A1* | 5/2006 | Garcia | H04L 12/1818 709/225 |
| 2006/0147017 | A1 | 7/2006 | Moody et al. | |
| 2006/0230071 | A1* | 10/2006 | Kass | G06F 17/30539 |
| 2006/0245558 | A1 | 11/2006 | Gatzke et al. | |
| 2006/0291630 | A1 | 12/2006 | Benco et al. | |
| 2007/0025530 | A1 | 2/2007 | Tidwell et al. | |
| 2007/0298787 | A1* | 12/2007 | Matharu | H04M 15/00 455/432.3 |
| 2008/0033778 | A1* | 2/2008 | Boss | G06Q 10/109 705/7.18 |
| 2008/0098313 | A1* | 4/2008 | Pollack | G06F 3/048 715/753 |
| 2008/0114716 | A1* | 5/2008 | Mock | G06Q 10/109 |
| 2008/0294483 | A1* | 11/2008 | Williams | G06Q 10/063116 705/7.16 |
| 2010/0114958 | A1 | 5/2010 | Korenshtein | |

\* cited by examiner

SYSTEM FOR MANAGING SCHEDULING CONFLICTS

CROSS-REFERENCE TO RELATED APPLICATIONS

This application is a continuation of and claims priority to U.S. patent application Ser. No. 14/516,738, filed Oct. 17, 2014, which is a continuation of and claims priority to U.S. patent application Ser. No. 14/274,034, filed May 9, 2014 (now U.S. Pat. No. 8,891,752), which is a continuation of and claims priority to U.S. patent application Ser. No. 13/951,660, filed Jul. 26, 2013 (now U.S. Pat. No. 8,761,368), which is a continuation of and claims priority to U.S. patent application Ser. No. 13/759,144, filed Feb. 5, 2013 (now U.S. Pat. No. 8,520,824), which is a continuation of and claims priority to U.S. patent application Ser. No. 11/780,696, filed Jul. 20, 2007 (now U.S. Pat. No. 8,391,459), the disclosures of all of which are hereby incorporated by reference in their entirety.

FIELD OF THE DISCLOSURE

The present disclosure relates generally to communication systems, and more specifically to a system for managing scheduling conflicts.

BACKGROUND

Electronic organizers such as a calendar feature in Personal Digital Assistants (PDAs) have become very popular with professionals who have busy schedules. These devices help professionals manage their time effectively and remove the burden of memorization and the use of paper-based organizers. Notwithstanding the popular use of organizers, scheduled events (professional or personal) are not always accurate in their duration or start times. Consequently, many users of electronic organizers have to resort to real-time rescheduling and at times require the manual assistance of a secretary to reorder scheduled events.

DETAILED DESCRIPTION

In one embodiment of the present disclosure, a computer-readable storage medium can have computer instructions for retrieving a called party number and a calling party number from a communication session, identifying a calling party according to the calling party number, identifying a called party according to the called party number, retrieving calendar information of the called party, detecting in the calendar information a scheduled event associated with the calling party, retrieving presence information of the called party, and detecting a conflict between the scheduled event and the presence information of the called party.

In one embodiment of the present disclosure, a proactive scheduler can have a controller element to determine a scheduling conflict between a called party and a calling party according to calendar information of the called party and presence information of the called party.

In one embodiment of the present disclosure, a presence system can have a controller element to present a scheduler presence information of a called party to determine a scheduling conflict between a calling party and the called party according to calendar information associated with the calling party and called party and said presence information.

Figure 1:
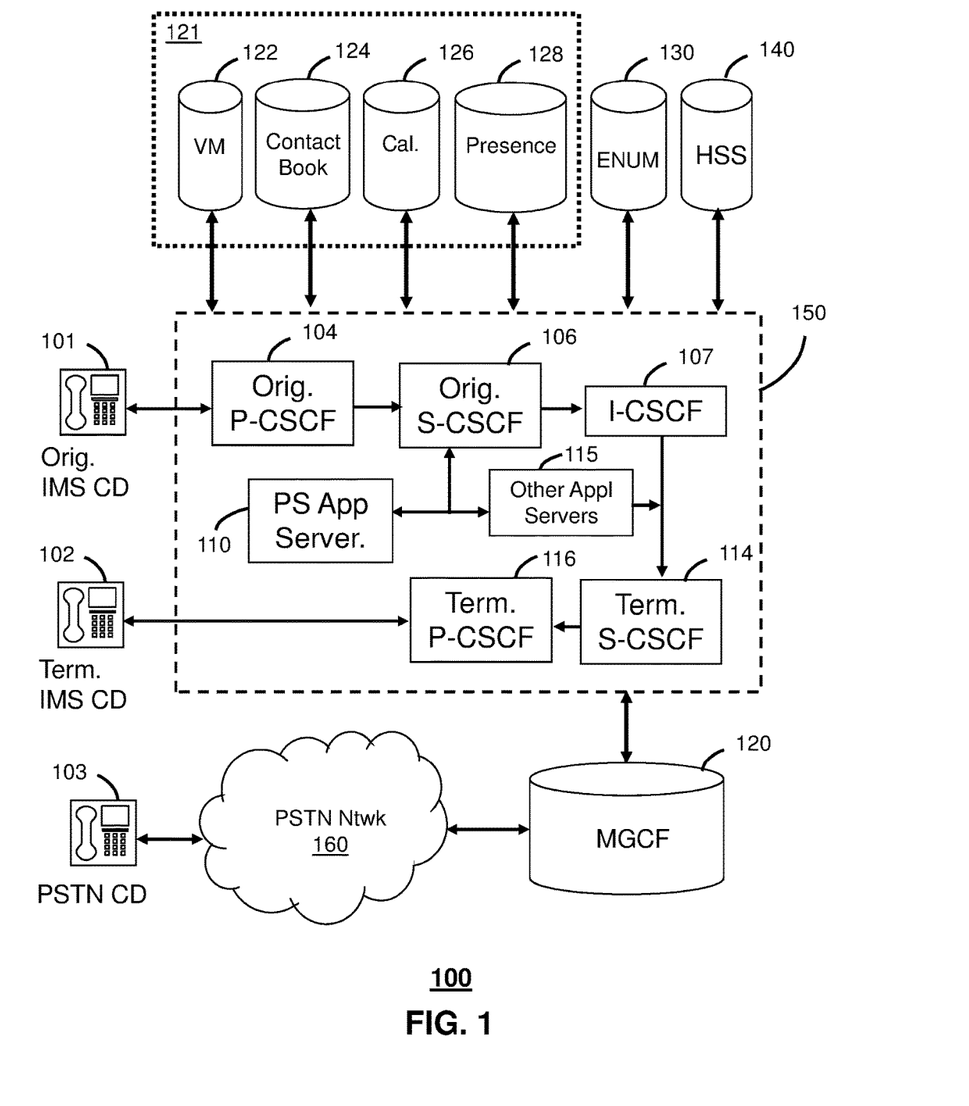
FIG. 1 depicts an exemplary embodiment of a communication system.

FIG. 1 depicts an exemplary communication system 100. The communication 100 can comprise a Subscriber Services System (SSS) 121, a Home Subscriber Server (HSS) 140, a tElephone NUmber Mapping (ENUM) server 130, and network elements of an IP Multimedia Subsystem (IMS) network 150. The IMS network 150 can be coupled to IMS compliant communication devices (CDs) 101, 102 or a PSTN CD 103 using a Media Gateway Control Function (MGCF) 120 that connects the call through a common PSTN network 160.

IMS CDs 101 and 102 register with the IMS network 150 by contacting a Proxy Call Session Control Function (P-CSCF) which communicates with a corresponding Serving CSCF (S-CSCF) to register the CDs using Authentication, Authorization and Accounting (AAA) with the HSS 140. To accomplish a communication session between CDs, an originating IMS CD 101 can submit a SIP INVITE message to an originating P-CSCF 104 which communicates with a corresponding originating S-CSCF 106.

The originating S-CSCF 106 can submit the SIP INVITE message to an application server (AS) such as references 110 and 115 to provide a variety of services to IMS subscribers. For example, the application server 115 can be used to perform originating treatment functions on the calling party number such as determining whether the calling party number has international calling services, and/or is requesting special telephony features (e.g., *72 forward calls, *73 cancel call forwarding, *67 for caller ID blocking, and so on).

Additionally, the originating S-CSCF 106 can submit queries to the ENUM system 130 to translate an E.164 telephone number to a SIP Uniform Resource Identifier (URI) if the targeted communication device is IMS compliant. If the targeted communication device is a PSTN device, the ENUM system 130 will respond with an unsuccessful address resolution and the S-CSCF 106 will forward the call to the MGCF 120 via a Breakout Gateway Control Function (not shown).

When the ENUM server 130 returns a SIP URI, the SIP URI is used by an Interrogating CSCF (I-CSCF) 107 to submit a query to the HSS 140 to identify a terminating S-CSCF 114 associated with a terminating IMS CD such as reference 102. Once identified, the I-CSCF 107 can submit the SIP INVITE to the terminating S-CSCF 114 which can call on an application server similar to reference 115 to perform the originating treatment telephony functions described earlier. The terminating S-CSCF 114 can then identify a terminating P-CSCF 116 associated with the terminating CD 102. The P-CSCF 116 then signals the CD 102 to establish communications. The aforementioned process is symmetrical. Accordingly, the terms "originating" and "terminating" in FIG. 1 can be interchanged.

The SSS 121 can be used to provide an assortment of additional services to a subscriber of for example a proactive scheduler operating as an application server (PSAS) 110 in the IMS network 150. The PSAS 110 can function as a sub-element of a unified messaging system. Service elements of the SSS 121 can include for example a voicemail server 122, a contact (or address) book server 124, a calendar server 126, and a presence server 128, among other possible systems. Each of these servers utilizes common computing and communication technology to exchange messages with the PSAS 110 in accordance with the present disclosure.

Figure 2:
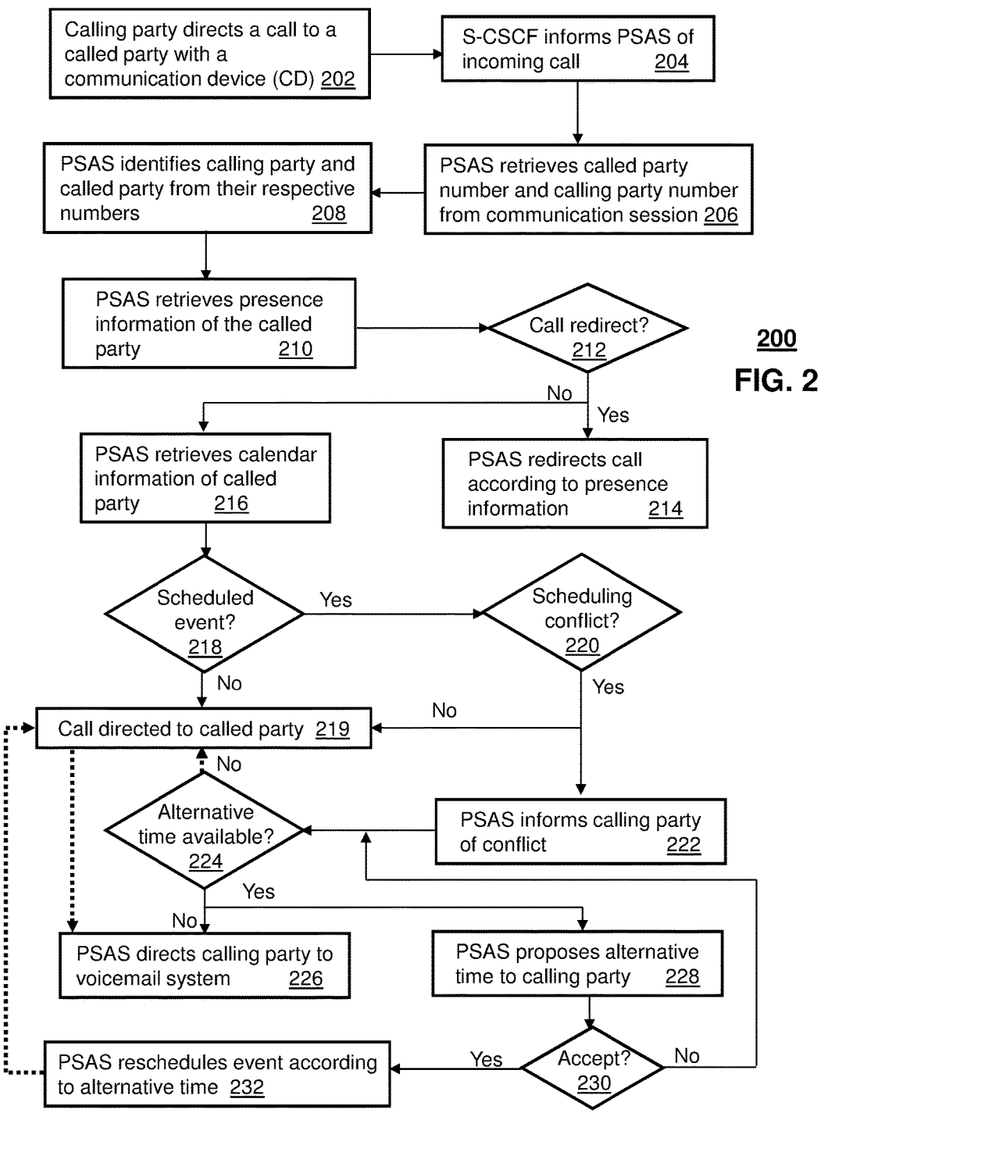
FIG. 2 depicts an exemplary method operating in portions of the communication system.

FIG. 2 depicts an exemplary method 200 operating in portions of the communication system 100. Method 200 begins with step 202 in which a calling party directs a call to a called party by way of a communication device (IMS 101 or 102, or PSTN 103). During the call setup process the terminating S-CSCF 114 can convey in step 204 the SIP INVITE message to the PSAS 110 thereby informing it of the incoming call. The PSAS 110 can retrieve a calling party number and called party number from the SIP INVITE message to identify in step 208 the calling party and the called party. The called party can be identified by the PSAS 110 by matching the called party number to an entry in a database accessible to the PSAS 110. The database can reside in the PSAS 110 or can be distributed in one or more network elements of the communication system 100 accessible to the PSAS 110. Once a match is found, the PSAS 110 can determine which services are available to the called party subscriber. Once the called party has been identified, the PSAS 110 can identify the calling party using any of several methods such as by matching the calling party number (or caller ID) to an entry in a contact book account of the called party managed by the contract book server 124. The contact book account can for example provide the PSAS 110 one or more names of the calling party (first name, nickname, surname and so on).

In step 210, the PSAS 110 can retrieve presence information of the called party from the presence server 128. Presence information can provide status information that indicates for example where the called party may be located, and/or which of a number of communication devices (e.g., cell phone, laptop computer, office phone, home phone, etc.) available to the called party are being used by said party.

The location of the called party can be determined a number of ways. For instance, location coordinates can be supplied by one or more of the communication devices of the called party using Global Positioning System (GPS) technology. The called party can also be located by common triangulation techniques. The location can also be correlated with known structures. For example, a location coordinate can indicate the called party is in his/her home, office, conference room of office building, and so on.

Presence information can also identify which of the communication devices available to the called party is being used by said party, and/or the most probable device from which a party can initiate communications with the called party. For example, if the called party is at his/her desk working on a desktop computer, the presence server can detect the called party's presence in an office by a proactive message supplied by the computer, or by detecting network activity emanating from the computer. The presence server can be configured to know that in the location of the desktop computer the called party also has an office phone. The presence server can also detect when the called party is traveling. For instance, the presence server can detect that a cell phone roaming from base station to base station. In this instance, the presence server can detect that the called party is in an automobile. Similarly, the presence server can detect that the called party is in different times zones (domestic or international).

From the foregoing examples, it would be evident to an artisan with ordinary skill in the art that the presence server 128 can utilize known and future techniques to identify the location and/or activities of a party having a plurality of communication means.

In step 212, the PSAS 110 can determine if the calling party has entered an emergency access code, has a communication priority level or assigned communication preference previously entered by the called party for redirecting calls. The priority or preference can be included in a contact book entry associated with the calling party which is stored and managed by the contact book server 124. A priority or preference can be entered by the called party to address calls from specific calling parties in different ways. For example, calls from the called party's manager should always be redirected to the called party's cell phone. Calls from a spouse or children during work hours should be directed to an office number. All other calls should be processed according to steps 214-230. The emergency access code can be for example a sequence of Dual Tone Multi-Frequency (DTMF) entries (e.g., *8) made by the calling party to identify the call as an emergency call that needs to be directed to the called party independent of who the calling party is. The PSAS 110 can process the DTMF sequence and detect that it corresponds to an emergency access code.

Accordingly if a call redirection is detected, the PSAS 110 proceeds to step 214 where it redirects the call according to preferences given and/or presence information of the called party. For instance if the calling preferences dictate calls to a cell phone, but the presence information indicates that the cell phone of the called party is off, then the call will be redirected to another communication device of the called party having the highest probability of reaching said party. In cases where more than one communication device has a similar probability of reaching the called party, the PSAS 110 can redirect the call from one communication device to the next until the called party is reached. If none of said devices reach the called party, the calling party can be directed to the voicemail server 122 to leave a voicemail message for the called party.

If call redirection is not required, the PSAS 110 proceeds to step 216 where it retrieves calendar information of the called party from the calendar server 126. The calendar information can represent one or more days, weeks or months worth of calendar events associated with the called party. The calendar period retrieved can start on the day which the calling party makes the call or some other suitable time. The amount of calendar information retrieved by the PSAS 110 is a policy consideration which can be configured by a service provider of the PSAS. In step 218, the PSAS 110 can determine from the calendar information whether there is a scheduled event between the calling party and the called party. This detection can take place for example by matching the name or caller ID of the calling party retrieved in step 208 with information supplied in the calendar event.

For example, a calendar event previously entered by the called party might say "Discuss milestones with Joe Doe" in which Joe Doe is to call the called party at 3 pm Central time. The list of invitees and/or the text portion 'Joe Doe' in the calendar event can be matched by the PSAS 110 with the name, nickname and/or surname of the calling party retrieved in step 208 to determine that there is a schedule event between the calling party and the called party at 3 pm Central time. If no scheduled event is detected in step 218, the PSAS 110 proceeds to step 219 where the call is directed to the called party by network elements of the IMS network 150 as originated by the calling party. If the called party does not answer, the PSAS 110 can direct the calling party to the voicemail system 122.

Otherwise in step 220, the PSAS 110 can determine whether there is a scheduling conflict based on the presence information retrieved in step 210. For example, the presence information can indicate that the called party is still actively engaged in a conference call. Additionally, the called party can proactively notify the presence server 128 that s/he will be 20 minutes late to the next meeting. This proactive notification can be the result of on an email or other messaging means (e.g., SMS, MMS, instant messaging, or otherwise) between the called party and the presence server 128 to provide said system additional status information. If no conflict is detected, the PSAS 110 proceeds to steps 219 and 226 as described earlier.

When a conflict is detected, the PSAS 110 can proceed to step 222 to inform the calling party of the conflict utilizing common speech synthesis techniques (e.g., "I understand that you have a meeting scheduled with Mr. Doe at 3 pm. Unfortunately, Mr. Doe is running late with his current meeting."). The PSAS 110 in step 224 can then determine from the calendar entries of the called party if an alternative time is available. The alternative time can arise from an unused time slot in the called party's calendar, or can be the result of the PSAS 110 shifting the called party's appointments based on the expected time of delay from the present meeting. Whether or not the PSAS 110 shifts existing appointments can be a preference established by the called party. The preference can be applied to all parties, or can be selectively applied depending on who the calling party is. Moreover the preferences can be in whole or in part stored and managed by the PSAS 110 and/or entries from the called party's contact book.

If for example the preference established for the calling party is such that the PSAS 110 cannot reschedule other appointments of the called party, and the called party's calendar has no available time slots during working hours to reschedule a call with the calling party, then the PSAS 110 can direct the calling party in step 226 to the voicemail system 122 under the assumption the presence information would indicate the called party does not want to be disturbed. If the called party is willing to accept calls at all times, the PSAS 110 can be configured instead to proceed to steps 219 and 226 as described earlier. If on the other hand, the preference established for the calling party is such that other appointments can be rescheduled and/or the called party has time slots available, the PSAS 110 can proceed to step 228 where it proposes to the calling party an alternative time for the scheduled appointment (e.g., "Would it be possible to reschedule your appointment with Mr. Doe to 3:30?") utilizing common speech synthesis and voice recognition techniques (much like those used by an interactive voice response system).

If the calling party accepts the proposal in step 230 by DTMF or voice detection (e.g., press 1 or say "yes"), the PSAS 110 can reschedule the appointment in step 232 according to the alternative time selected. To maintain an updated calendar schedule, the PSAS 110 can direct in this step the calendar server 126 to update its database for the called party according to the rescheduled appointment. After step 232, the call can be terminated by the calling party, or the calling party can be directed by the PSAS 110 to complete the call in steps 219 and 226 as described above. Proceeding to step 219 can be an option proposed to the calling party by the PSAS 110 utilizing a common interactive voice response system.

If on the other hand the calling party does not accept the proposed alternative time, the PSAS 110 can proceed to step 224 where it determines another time and/or asks the calling party to propose a time that works for him/her. Steps 224, 228 and 230 can be iterative until the PSAS 110 satisfactorily determines an alternative appointment time with the calling party or transfers the calling party to the voicemail system in step 226 if a resolution cannot be determined or if voicemail is requested by the calling party.

Upon reviewing the aforementioned embodiments, it would be evident to an artisan with ordinary skill in the art that said embodiments can be modified, reduced, or enhanced without departing from the scope and spirit of the claims described below. For instance, the present disclosure can be applied in a PSTN only communication system that does not utilize IMS or VoIP communications. Method 200 can have more or less steps and in different order without adversely affecting the present disclosure.

Other appointment resolution techniques can also be applied to the present disclosure. For instance, when a conflict is detected and the calling party is informed, the calling party can submit a signal to the PSAS 110 of the called party to redirect the call to a PSAS of the calling party so that two automated systems can proactively resolve the conflict based on the called party's and calling party's calendars and presence data. The signal can be the calling party's unified messaging number or the caller ID entered with a DTMF sequence or spoken. Alternatively, the PSAS 110 can recognized that the calling party is also a subscriber of the same system and can offer the calling party the option to automatically resolve the conflict with or without the calling party participating in the resolution. In this embodiment, once the conflict is resolved, the calendars of the called party and calling party are updated respectively without manual interaction from either party.

Other suitable modifications can be applied to the present disclosure without deviating from the scope of the claims. Accordingly, the reader is directed to the claims section for a fuller understanding of the breadth and scope of the present disclosure.

Figure 3:
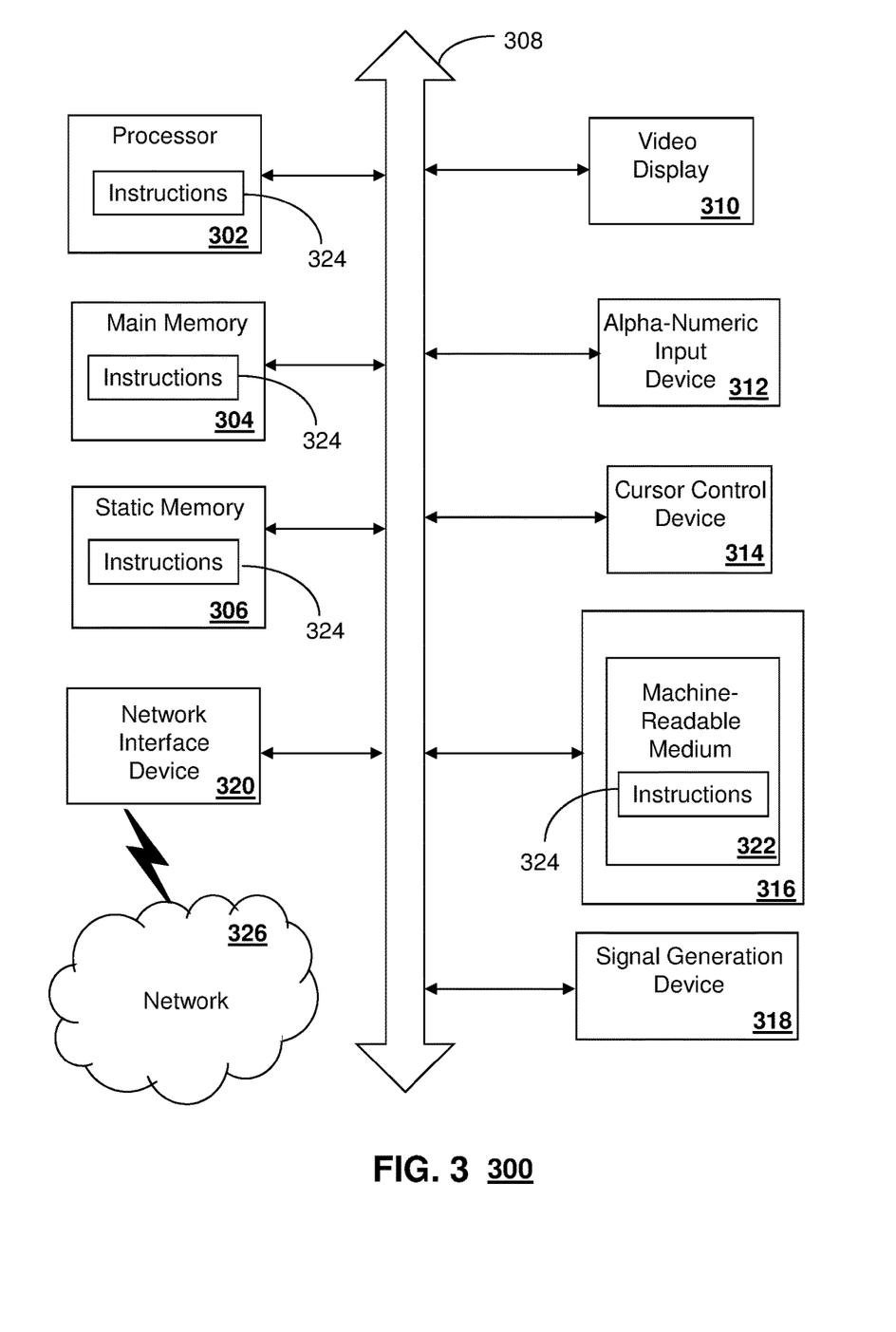
FIG. 3 depicts an exemplary diagrammatic representation of a machine in the form of a computer system within which a set of instructions, when executed, may cause the machine to perform any one or more of the methodologies disclosed herein.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a mass storage medium 316, a signal generation device 318 (e.g., a speaker or remote control) and a network interface device 320.

The mass storage medium 316 may include a computer-readable storage medium 322 on which is stored one or more sets of instructions (e.g., software 324) embodying any one or more of the methodologies or functions described herein, including those methods illustrated above. The computer-readable storage medium 322 can be an electromechanical medium such as a common disk drive, or a mass storage medium with no moving parts such as Flash or like non-volatile memories. The instructions 324 may also reside, completely or at least partially, within the main memory 304, the static memory 306, and/or within the processor 302 during execution thereof by the computer system 300. The main memory 304 and the processor 302 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the computer-readable storage medium 322 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    detecting, by a system including a processor, a scheduled event associated with a calling party to a communication session;
    retrieving, by the system, presence information of a called party to the communication session, wherein the presence information includes location data obtained from a first communication device of a plurality of communication devices of the called party using global positioning system technology;
    detecting, by the system, a conflict with the scheduled event according to the presence information of the called party;
    informing, by the system, the calling party of the conflict utilizing a conflict notification that includes synthesized speech;
    resolving, by the system, the conflict by adjusting a start time of scheduled events of the called party without regard for a preference established by the called party;
    identifying, by the system, the first communication device as a preferred communication device of the called party in accordance with the preference;
    responsive to the identifying of the first communication device as the preferred communication device of the called party, determining, by the system, that the first communication device is off in accordance with the presence information;
    identifying, by the system, a second communication device of the plurality of communication devices responsive to the determining that the first communication device is off, wherein the identifying of the second communication device is based on a determination that a call associated with the communication session has a higher probability of reaching the called party via the second communication device than the call reaching the called party via a third communication device of the plurality of communication devices; and
    redirecting, by the system, the communication session to the second communication device responsive to the identifying of the second communication device.

2. The method of claim 1, further comprising:
    retrieving, by the system, a called party number and a calling party number from an invite message associated with the scheduled event between the calling party and the called party;
    identifying, by the system, the calling party according to the calling party number; and
    identifying, by the system, the called party according to the called party number.

3. The method of claim 2, wherein:
    the system comprises an internet protocol multimedia subsystem network having an application server; and
    wherein the retrieving of the called party number and calling party number is performed by the application server.

4. The method of claim 1, further comprising:
    retrieving, by the system, calendar information of the called party, wherein the calendar information is retrieved from a calendar server;
    wherein the detecting the scheduled event associated with the calling party comprises detecting in the calendar information the scheduled event associated with the calling party; and
    wherein the detecting in the calendar information the scheduled event associated with the calling party is based on recognition of a name of the calling party in a text portion of the calendar information that was entered by the called party to generate an entry for the scheduled event.

5. The method of claim 1, wherein the presence information is retrieved from a presence server.

6. The method of claim 1, further comprising:
    adjusting, by the system, a calendar associated with the calling party responsive to the adjusting of the start time of the scheduled events of the called party.

7. The method of claim 1, wherein the redirecting the communication session to the second communication device of the called party further comprises redirecting the communication session according to a communication priority level.

8. The method of claim 1, further comprising:
    identifying, by the system, the first communication device of the plurality of communication devices as the preferred communication device of the called party for the scheduled event in accordance with the preference established by the called party, wherein the preference established by the called party comprises an identification of the calling party.

9. The method of claim 1, further comprising:
    responsive to the redirecting of the communication session to the second communication device failing, determining, by the system, that the call associated with the communication session has a higher probability of reaching the called party via the third communication device than the call reaching the called party via a fourth communication device of the plurality of communication devices; and
    redirecting, by the system, the communication session to the third communication device responsive to the determining that the call associated with the communication session has a higher probability of reaching the called party via the third communication device than the call reaching the called party via a fourth communication device of the plurality of communication devices.

10. An application server, comprising:
    a memory to store computer instructions; and
    a controller element coupled with the memory, wherein the controller element, responsive to executing the computer instructions, performs operations comprising:
        detecting a scheduled event of a calling party, wherein the calling party is associated with a communication session;
        retrieving presence information of a called party, wherein the called party is associated with the communication session, and wherein the presence information includes location data obtained from a first communication device of a plurality of communication devices of the called party using global positioning system technology;
        detecting, according to the presence information of the called party, a conflict with the scheduled event;
        informing the calling party of the conflict utilizing a conflict notification that includes synthesized speech;
        resolving the conflict by adjusting a start time of scheduled events of the called party, wherein the start time is adjusted without regard for a preference established by the called party;

identifying the first communication device as a preferred communication device of the called party in accordance with the preference;
responsive to the identifying of the first communication device as the preferred communication device of the called party, determining that the first communication device is off in accordance with the presence information;
identifying a second communication device of the plurality of communication devices responsive to the determining that the first communication device is off, wherein the identifying of the second communication device is based on a determination that a call associated with the communication session has a higher probability of reaching the called party via the second communication device than the call reaching the called party via a third communication device of the plurality of communication devices; and
redirecting the communication session to the second communication device responsive to the identifying of the second communication device.

11. The application server of claim 10, wherein the operations further comprise:
retrieving a called party number and a calling party number from an invite message of the communication session, wherein the invite message is associated with the scheduled event between the calling party and the called party;
identifying the calling party according to the calling party number;
identifying the called party according to the called party number; and
determining whether the calling party and the called party are subscribers of a same service provider.

12. The application server of claim 11, wherein the informing of the calling party of the conflict comprises informing the calling party of the conflict over another communication session with a mobile communication device of the calling party utilizing the conflict notification that includes synthesized speech;
wherein the application server operates in an internet protocol multimedia subsystem communication system; and
wherein the invite message is associated with a voice over internet protocol call.

13. The application server of claim 10, wherein the operations further comprise:
retrieving calendar information of the called party from a calendar server; and
detecting in the calendar information the scheduled event of the calling party.

14. The application server of claim 13, wherein the detecting in the calendar information the scheduled event of the calling party is based on recognition of a name of the calling party in a text portion of the calendar information.

15. The application server of claim 14, wherein the text portion of the calendar information was entered by the called party to generate an entry for the scheduled event.

16. The application server of claim 10, wherein the retrieving the presence information of the called party comprises retrieving the presence information of the called party from a presence server, and wherein the controller element comprises a plurality of processors operating in a distributed processing environment.

17. The application server of claim 10, wherein the redirecting of the communication session to the second communication device comprises redirecting communications of a first communication device of the calling party to the second communication device of the plurality of communication devices according to the presence information.

18. A presence system, comprising:
a memory to store computer instructions; and
a controller element coupled with the memory, wherein the controller element, responsive to executing the computer instructions, performs operations comprising:
supporting an internet protocol multimedia subsystem network;
receiving an identity of a called party that was obtained by an application server of the internet protocol multimedia subsystem network from an invite message of a call that is associated with a scheduled event between a calling party and the called party;
presenting, to a scheduler, presence information of the called party based on the identity to determine a scheduling conflict for the call between the calling party and the called party, wherein the presence information includes location data obtained from a first communication device of a plurality of communication devices of the called party using global positioning system technology, and wherein the scheduler adjusts scheduled events of the called party by adjusting a start time of the scheduled events of the called party without regard for a preference established by the called party;
informing the calling party of the scheduling conflict utilizing a conflict notification that includes synthesized speech;
identifying the first communication device as a preferred communication device of the called party in accordance with the preference;
responsive to the identifying of the first communication device as the preferred communication device of the called party, determining that the first communication device is off in accordance with the presence information;
identifying a second communication device of the plurality of communication devices responsive to the determining that the first communication device is off, wherein the identifying of the second communication device is based on a determination that the call has a higher probability of reaching the called party via the second communication device than the call reaching the called party via a third communication device of the plurality of communication devices; and
redirecting the call to the second communication device responsive to the identifying of the second communication device.

19. The presence system of claim 18, wherein the call from the calling party that is associated with the invite message is redirected to a voicemail of the called party when there are no available time slots for rescheduling to resolve the scheduling conflict.

20. The presence system of claim 18, wherein the controller element comprises a plurality of processors operating in a distributed processing environment.

* * * * *